US009747493B2

United States Patent
Rodriguez et al.

(10) Patent No.: US 9,747,493 B2
(45) Date of Patent: Aug. 29, 2017

(54) FACE POSE RECTIFICATION METHOD AND APPARATUS

(71) Applicant: KEYLEMON SA, Martigny (CH)

(72) Inventors: Yann Rodriguez, Volleges (CH);
Francois Moulin, Volleges (CH);
Sebastien Piccand, Martigny (CH)

(73) Assignee: Keylemon SA (CH)

( * ) Notice: Subject to any disclaimer, the term of this patent is extended or adjusted under 35 U.S.C. 154(b) by 35 days.

(21) Appl. No.: 14/493,882

(22) Filed: Sep. 23, 2014

(65) Prior Publication Data

US 2016/0086017 A1   Mar. 24, 2016

(51) Int. Cl.
*G06K 9/00* (2006.01)
*G06T 15/04* (2011.01)
*G06T 5/50* (2006.01)
*G06T 7/73* (2017.01)

(52) U.S. Cl.
CPC ..... *G06K 9/00288* (2013.01); *G06K 9/00281* (2013.01); *G06T 5/50* (2013.01); *G06T 7/75* (2017.01); *G06T 15/04* (2013.01); *G06T 2200/21* (2013.01); *G06T 2207/10028* (2013.01); *G06T 2207/10048* (2013.01); *G06T 2207/30201* (2013.01)

(58) Field of Classification Search
CPC ......... G06T 2207/10028; G06T 11/001; G06T 19/20; G06T 2207/10048; G06T 2207/30196; G06T 2207/30201; G06T 2207/30241; G06T 7/0046; G06K 9/00288; G06K 9/6289
USPC ....................................... 382/118
See application file for complete search history.

(56) References Cited

U.S. PATENT DOCUMENTS

| | | | |
|---|---|---|---|
| 6,381,346 B1 | 4/2002 | Eraslan | |
| 7,289,648 B2* | 10/2007 | Liu | G06K 9/00275 345/420 |
| 7,756,325 B2 | 7/2010 | Vetter et al. | |
| 7,929,775 B2 | 4/2011 | Hager et al. | |
| 8,055,028 B2 | 11/2011 | Park et al. | |
| 8,199,979 B2 | 6/2012 | Steinberg et al. | |
| 8,406,484 B2 | 3/2013 | Yoon et al. | |

(Continued)

FOREIGN PATENT DOCUMENTS

EP   1039417 A1   9/2000

OTHER PUBLICATIONS

I. A. Kakadiaris, et al., "Three-Dimensional Face Recognition in the Presence of Facial Expressions: An Annotated Deformable Model Approach", IEEE Transactions on Pattern Analysis and Machine Intelligence, vol. 29, No. 4, Apr. 2007, pp. 640-649.

(Continued)

*Primary Examiner* — Manuchehr Rahmjoo
(74) *Attorney, Agent, or Firm* — Blank Rome LLP (57) ABSTRACT

A pose rectification method for rectifying a pose in data representing face images, comprising the steps of:
A—acquiring a least one test frame including 2D near infrared image data, 2D visible light image data, and a depth map;
C—estimating the pose of a face in said test frame by aligning said depth map with a 3D model of a head of known orientation;
D—mapping at least one of said 2D image on the depth map, so as to generate textured image data;
E—projecting the textured image data in 2D so as to generate data representing a pose-rectified 2D projected image.

16 Claims, 7 Drawing Sheets

(56) References Cited

U.S. PATENT DOCUMENTS

| | | |
|---|---|---|
| 8,553,973 B2 | 10/2013 | Knothe et al. |
| 8,660,306 B2 | 2/2014 | Tu et al. |
| 8,787,663 B2 * | 7/2014 | Litvak ................ G06K 9/00375 382/165 |
| 2013/0156262 A1 | 6/2013 | Taguchi et al. |

OTHER PUBLICATIONS

R. Niese, et al., "A Novel Method for 3D Face Detection and Normalization", Journal of Multimedia, vol. 2, No. 5, Sep. 2007, pp. 1-12.
Z. Chen, et al., "RBG-NIR Multispectral Camera", Optics Express, vol. 22, No. 5, Feb. 24, 2014, 10 pages.
International Search Report and Written Opinion for PCT/EP2014/070282 filed Sep. 23, 2014, 14 pages.
Fanelli, G. et al., "Real Time Head Pose Estimation with Random Regression Forests", Computer Vision and Pattern Recognition (CVPR), 2011 IEEE Conference, pp. 617-624.

\* cited by examiner

FACE POSE RECTIFICATION METHOD AND APPARATUS

FIELD OF THE INVENTION

The present invention relates to a face pose rectification method and apparatus.

DESCRIPTION OF RELATED ART

Face recognition involves the analysis of data representing a test image (or a set of test images) of a human face and its comparison with a database of reference images. The test image is usually a 2D image captured with a common 2D camera while the reference image is a 2D image or sometimes a 3D image captured with a depth camera for example.

Prior approaches to face recognition usually assume that the test image and the reference images are all captured in a full frontal view. Therefore, various performing algorithms have been developed for classifying frontal test images and for matching them with corresponding frontal reference images.

The reliability of the recognition however quickly decreases if the test image is captured from a non-frontal point of view. In order to solve this problem, it has already been suggested in the prior art to rectify the pose, i.e., to warp the test image in order to generate, from a non-frontal test image, a synthetic frontal test image.

Therefore, fast and robust methods for estimating and then correcting the head pose are essential in many applications such as face recognition or, more generally, face classification and face processing.

U.S. Pat. No. 8,055,028 concerns a method of normalizing a non-frontal 2D facial image to a frontal facial image. The method comprises: determining a pose of a non-frontal image of an object; performing smoothing transformation on the non-frontal image of the object, thereby generating a smoothed object image; and synthesizing a frontal image of the object by using the pose determination result and the smoothed object image. The pose is determined by obtaining a first mean distance between object feature points existing in both sides of the centre line of the non-frontal image.

U.S. Pat. No. 8,199,979 discloses a method for classifying and archiving images including face regions that are acquired with a 2D image acquisition device. A face detection module identifies a group of pixels corresponding to a face region. The face orientation and pose is then determined. In case of a half-profile face, a normalization module transforms the candidate face region into a 3D space, and then rotates it until the appropriate pose correction is made. Alternatively, the texture, colour and feature regions of the 2D face region are mapped onto a 3D model which is then rotated to correct the pose. This results however in a massive deformation when the 2D image is mapped onto a 3D model of a different face.

U.S. Pat. No. 7,929,775 discloses a method for matching portions of a 2D image to a 3D class model. The method comprises identifying image features in the 2D image; computing an aligning transformation between the class model and the image; and comparing, under the aligning transformation, class parts of the class model with the image features.

U.S. Pat. No. 7,289,648 discloses a method for automatically modelling a three dimensional object, such as a face, from a single image. The system and method according to the invention constructs one or more three dimensional (3D) face models using a single image. It can also be used as a tool to generate a database of faces with various poses which are needed to train most face recognition systems.

US2013156262 suggests an estimation of the pose of an object by defining a set of pair features as pairs of geometric primitives, wherein the geometric primitives include oriented surface points, oriented boundary points, and boundary line segments. Model pair features are determined based on the set of pair features for a model of the object. Scene pair features are determined based on the set of pair features from data acquired by a 3D sensor, and then the model pair features are matched with the scene pair features to estimate the pose of the object.

The pose rectification from a 2D image is however a difficult task and the quality of the rectification is usually not robust since it depends on the amplitude of correction to be achieved, on occlusions, illumination, and so on.

In order to overcome some of the problems inherent of head estimate pose based on 2D data, it has already been suggested to use the additional depth information provided by depth sensors, which are becoming increasingly available and affordable.

U.S. Pat. No. 8,660,306 discloses a method for the correction of a human pose determined from depth data. The method comprises receiving depth image data, obtaining an initial estimated skeleton of an articulated object from depth image data, applying a random forest subspace regression function (a function that utilizes a plurality of random splitting/projection decision trees) to the initial estimated skeleton, and determining the representation of the pose based upon a result of applying the random forest subspace regression to the initial estimated skeleton. The method is in particular adapted to the estimation of pose of the whole body.

U.S. Pat. No. 6,381,346 describes a system for generating facial images, indexing those images by composite codes and for searching for similar two-dimensional facial images. 3D images of human faces are generated from a data repository of 3D facial feature surface shapes. These shapes are organized by facial feature parts. By assembling a shape for each facial part, a 3D facial image is formed.

U.S. Pat. No. 8,406,484 concerns a facial recognition apparatus, comprising: a two-dimensional information acquisition unit to acquire two-dimensional image information of a subject; a three-dimensional information acquisition unit to acquire three-dimensional image information of the subject; a user information database to store an elliptical model corresponding to three-dimensional face information of a user and two-dimensional face information of the user; and a control unit to perform facial recognition using the two-dimensional image information of the subject, to determine whether a recognized face is the user's face, to match the elliptical model of the user to the three-dimensional image information, to calculate an error upon determining that the recognized face is the user's face, and to determine whether the user's face is improperly used based on the error.

U.S. Pat. No. 7,756,325 discloses an algorithm for estimating the 3D shape of a 3-dimensional object, such as a human face, based on information retrieved from a single photograph. Beside the pixel intensity, the invention uses various image features in a multi-features fitting algorithm (MFF).

EP1039417 concerns a method of processing an image of a three-dimensional object, including the steps of providing a morphable object model derived from a plurality of 3D images, matching the morphable object model to at least one 2D object image, and providing the matched morphable object model as a 3D representation of the object.

U.S. Pat. No. 8,553,973 concerns another methods and systems for modelling 3D objects (for example, human faces).

With the emergence of depth sensors in a variety of consumer devices, such as game consoles, laptops, tablets, smartphones, and cars for example, more and more images of faces will include a depth map. A popular example of a depth sensor that produces RGB-D datasets is the Kinect input device proposed by Microsoft for Xbox 360, Xbox One and Windows PC (all trademarks of Microsoft, Inc). Depth sensors produce 2.5D image datasets include an indication of depth (or distance to the light source) for each pixel of the image, but no indication about hidden or occluded elements, such as the back of the head for example.

It would be desirable to provide new face recognition methods where test images are captured with depth sensors, and then compared with existing 2D images. Such a method would have the advantage of using modern depth sensors for the acquisition of RGB-D image data, and to compare them with widely available 2D reference images.

It would also be desirable to provide new methods using the capabilities of depth sensors and RGB-D datasets in order to improve the task of pose rectification.

It would also be desirable to provide a new method for evaluating a head pose which is faster than existing methods.

It would also be desirable to provide a new method for evaluating a head pose which is more precise than existing methods.

It would also be desirable to provide a new method for evaluating a head pose which can handle large pose variations.

It would also be desirable to provide a new method for evaluating a head pose which can handle large pose variations.

BRIEF SUMMARY OF THE INVENTION

It is therefore an aim of the present invention to propose a new method for rectifying a pose in 2.5D datasets representing face images.

According to the invention, these aims are achieved by means of a pose rectification method for rectifying a pose in data representing face images, comprising the steps of:

A-acquiring at least one test frame including 2D near infrared image data, 2D visible light image data, and a depth map;

C-estimating the pose of a face in said test frame by aligning said depth map with a 3D model of a head of known orientation;

D-mapping at least one of said 2D image on the depth map, so as to generate textured image data;

E-projecting the textured image data in 2D so as to generate data representing a pose-rectified 2D projected image.

The use of a depth map (i.e. a 2.5D dataset) is advantageous since it improves the precision and robustness of the pose estimation step.

The use of visible light data is advantageous since it allows a detection of features that depends on skin colour or texture for example.

The use of near infrared (NIR) image data is advantageous since it is less dependent on illumination conditions than visible light data.

The head pose is estimated by fitting the depth map with an existing 3D model, so as to estimate the orientation of the depth map. This pose estimation is particularly robust.

The 3D model could be a generic model, i.e., user-independent model.

The 3D model could be a user dependent model, for example a 3D model of the head of the user whose identity needs to be verified.

The 3D model could be a gender-specific model, or an ethnic-specific model, or an age-specific model, and selected based on an a priori knowledge of the gender, ethnicity and/or age.

The existing 3D model is used for estimating the pose of the face. However, the 2D image data is not mapped onto this 3D model, but on the depth map.

The method may comprise a further step of classifying image, for example classifying the 2D projected image.

The classification may include face authentication, face identification, gender estimation, age estimation, and/or detection of other facial features.

The method may comprise a step of further processing the 2D projected image.

The acquisition step may comprise a temporal and/or spatial smoothing of points in the depth map, in order to remove noise generated by the depth sensor.

The step of estimating the pose may include a first step of performing a rough pose estimation, for example based on a random regression forest method.

The step of estimating the pose may include a second step of fine pose estimation. The fine pose estimation may be based on the result of the rough pose estimation.

The fine pose estimation may be based for example on an alignment of the depth map with a 3D model, using rigid Iterative Closest Point (ICP) methods.

The method may further include a step of basic face detection before said pose estimation, in order to eliminate at least some portions of the 2D near-infrared image, and/or of said 2D visible light image, and/or of said depth map which do not belong to the face.

The method may further include a step of foreground extraction in order to eliminate portions of said 2D near-infrared image, and/or of said 2D visible light image, and/or of said 2D near-infrared which do not belong to the foreground.

The step of aligning the depth map with an existing 3D model of a head may comprise scaling the depth map, so that some of its dimensions (for example the maximal height) match corresponding dimensions of the 3D model.

The step of fitting the depth map with an existing 3D model of a head may comprise warping the depth map and/or the 3D model.

The method may comprise a further step of correcting the illumination of the 2D visible light image dataset based on the 2D near-infrared image dataset. Shadows or bright zones in the 2D visible light image dataset that do not appear in the 2D near-infrared image dataset may thus be corrected.

The method may comprise a further step of flagging portions of said pose-rectified 2D projected image data which correspond to portions not visible on the depth map and/or on the 2D image.

The method may comprising a further step of reconstructing portions of the pose-rectified 2D projected image data which correspond to unknown portions of the depth map.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The detailed description set forth below in connection with the appended drawings is intended as a description of various embodiments of the present invention and is not intended to represent the only aspects in which the present disclosure may be practiced. Each aspect described in this disclosure is provided merely as an example or illustration of the present invention, and should not necessarily be construed as preferred or essential.

Figure 1:
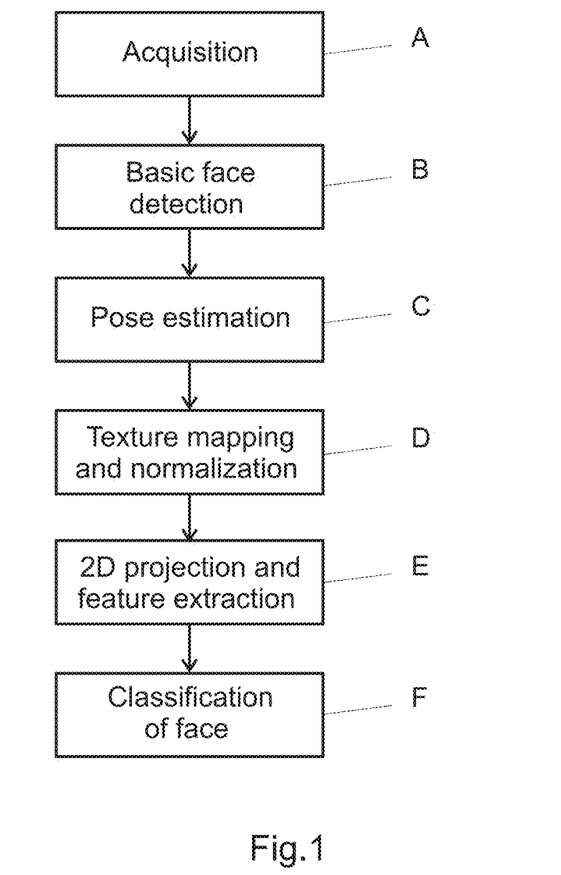
FIG. 1 is a flowchart of the method of the invention.

FIG. 1 is a flowchart that schematically illustrates the main steps of an example of pose rectification method according to the invention. This method could be carried out with the apparatus or system schematically illustrated as a block diagram on FIG. 2. In this example, the apparatus comprises a camera 101 for capturing an image of a user 100. The camera 101 might be a depth camera, such as without restriction a Kinect camera (trademark of Microsoft), a time-of-flight camera, or any other camera able to generate a RGB-D data stream.

Figure 2:
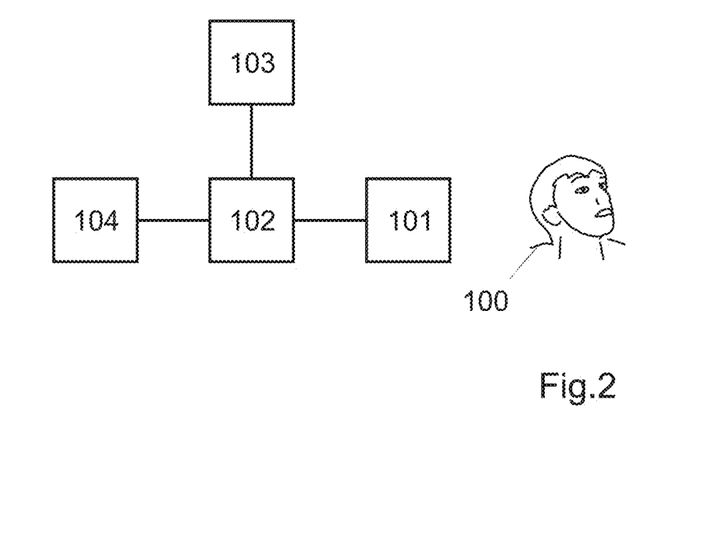
FIG. 2 is a schematic view of an apparatus according to the invention.

The camera 101 is connected to a processor 102 accessing a memory 104 and connected to a network over a network interface 103. The memory 104 may include a permanent memory portion for storing computer-code causing the processor to carry out at least some steps of the method of FIG. 1. The memory 104, or portions of the memory 104, might be removable.

As used herein, the apparatus 101+102+104 may take the form of a mobile phone, personal navigation device, personal information manager (PIM), car equipment, gaming device, personal digital assistant (PDA), laptop, tablet, notebook and/or handheld computer, smart glass, smart watch, smartTV, other wearable device, etc.

Figure 12:
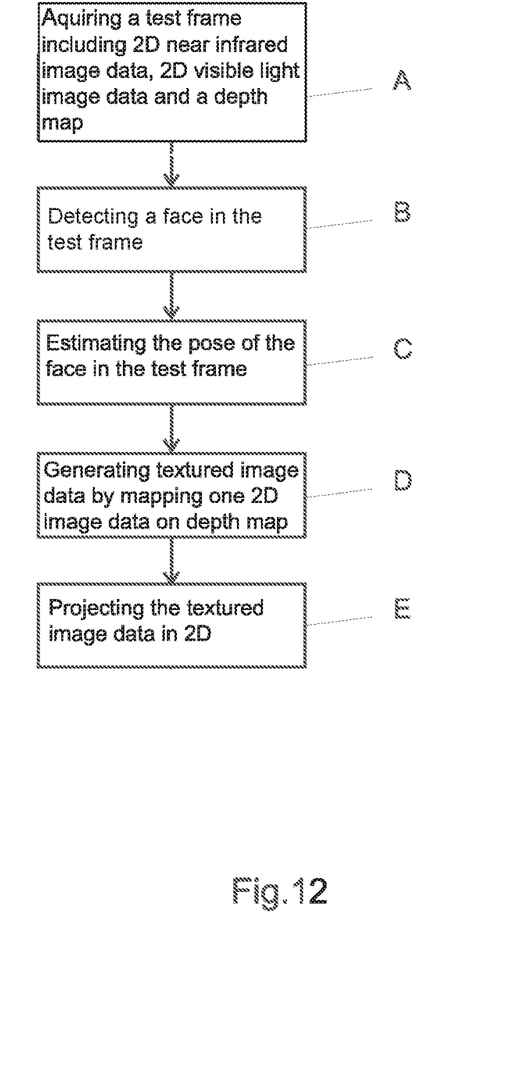
FIG. 12 is a flowchart of the method of the invention.

In acquisition step A of FIGS. 1 and 12, a test video stream is produced by the depth camera 101 in order to capture test images of the user 100 to be identified or otherwise classified.

In the present description, the expression "test images" designates images of a face whose pose needs to be rectified, typically during test (for identification or authentication), but also during enrolment.

Figure 3:
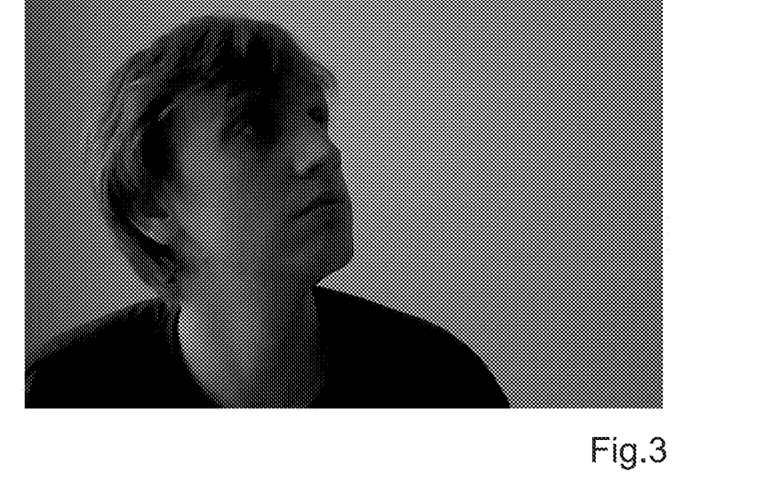
FIG. 3 illustrates an example of a 2D visible light image of a face.
Figure 4:
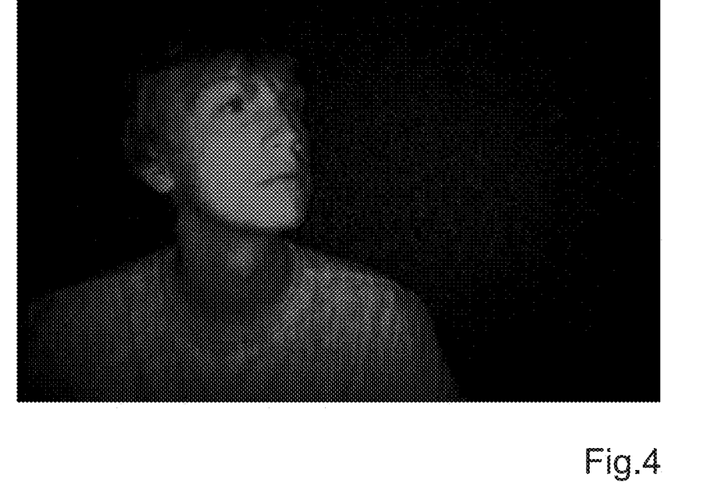
FIG. 4 illustrates an example of a 2D near-infrared image of the face of FIG. 3.

Each frame of the test video stream preferably includes three temporally and spatially aligned datasets:

i) a first (optional) dataset corresponding to a two dimensional (2D) visible light image of the face of the user 100 (such as a grayscale or RGB image for example). One example is illustrated on FIG. 3.

ii) a second (optional) dataset representing a 2D near-infrared (NIR) image of the face of the user 100. One example is illustrated on FIG. 4.

iii) a depth map (i.e. a 2.5D dataset) where the value associated with each pixel depends on the depth of the light emitting source, i.e. its distance to the depth sensor in the camera 101. A representation of such a depth map is illustrated on FIG. 5.

Figure 6:
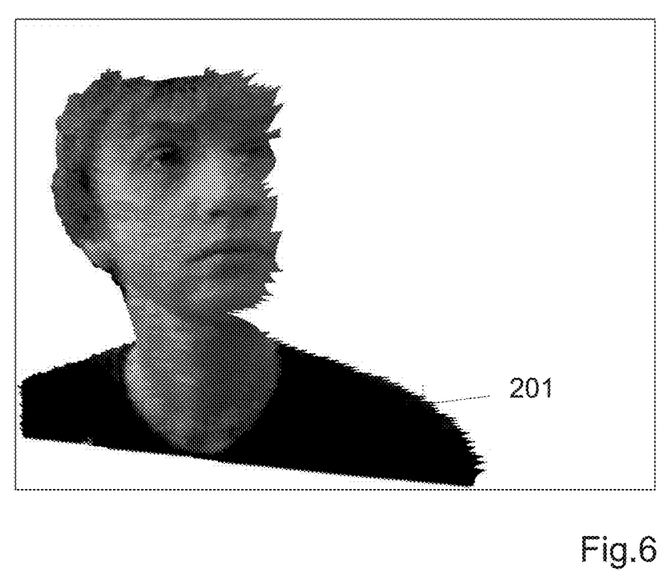
FIG. 6 illustrates an example of a representation of a textured depth map of the face of FIG. 3.

FIG. 6 is another representation 201 of a frame, in which the first RGB dataset is projected onto the depth map.

Figure 5:
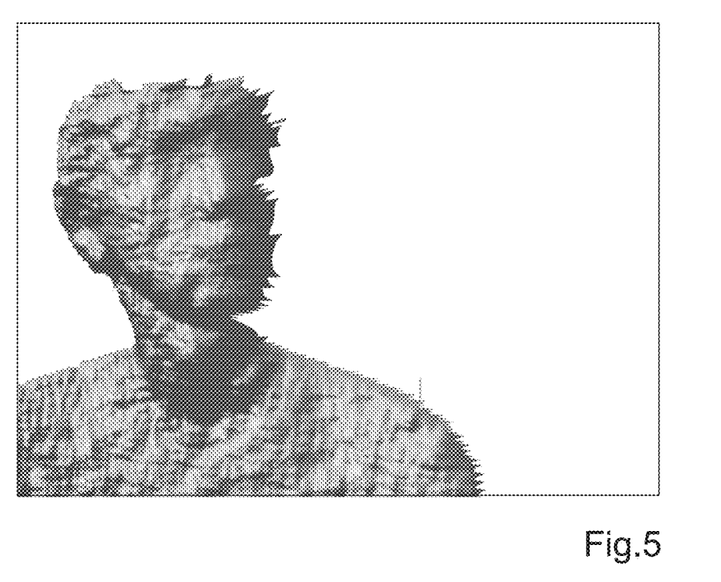
FIG. 5 illustrates an example of a representation of a depth map of the face of FIG. 3.

As can be seen on FIG. 5, many low costs depth sensors generate noisy depth maps, i.e. datasets where the depth value assigned to each point includes noise. The detrimental influence of noise can be reduced by smoothing the depth map. The smoothing may include a low-pass filtering of the depth map in the spatial and/or in the temporal (across successive frames) domain.

In the basic face detection step B of FIGS. 1 and 12, the portion of each dataset that represent the user face is detected and isolated from the background and other elements of the image. This detection might be performed on any or all of the three datasets, and applied to any or all of those datasets.

In one embodiment, this basic face detection is based, at least in part, on a thresholding of the depth map, in order to exclude pixels which are not in a predefined depth range, for example between 20 cm and 100 cm. Other known algorithms could be used for extracting the foreground that represents the user face, and excluding the background, including for example algorithms based on colour detection.

In the head pose estimation step C of FIGS. 1 and 12, the pose of the user in the frame is estimated. In one embodiment, this estimation is performed in two successive steps:

During a first part of the head pose estimation step, a rough estimate of the head pose is determined. In one embodiment, the computation of this rough estimate uses a random forest algorithm, in order to quickly determine the head pose with a precision of a few degrees. A method of rough head pose estimation with random regression forest is disclosed in G. Fanelli et al., "Real Time Head Pose Estimation with Random Regression Forests", Computer Vision and Pattern Recognition (CVPR), 2011 IEEE Conference on, 617-624. Preferably, the location of the nose and/or of other key features of the face is also determined during this step.

Figure 7:
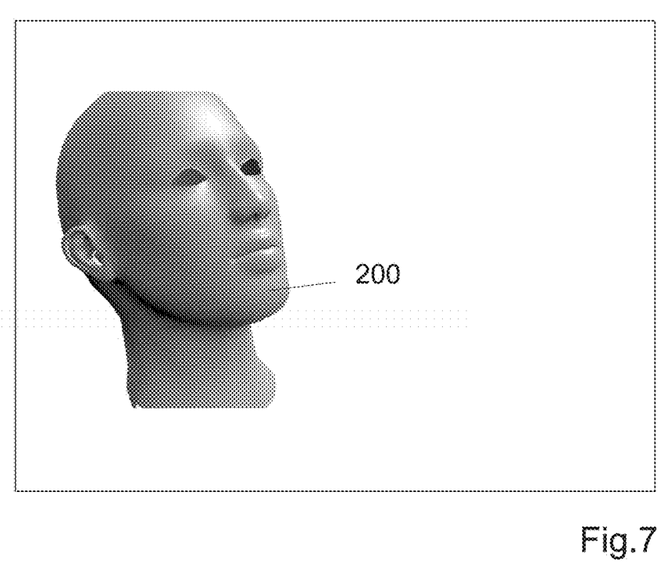
FIG. 7 illustrates an example of a generic head model used for the head pose estimation.
Figure 8:
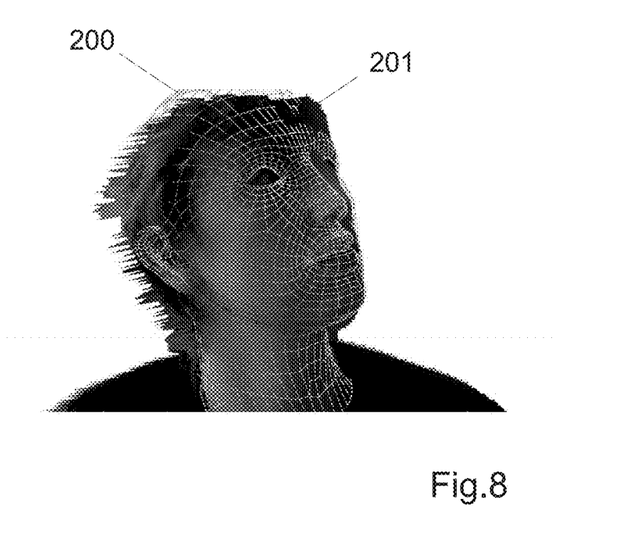
FIG. 8 illustrates the step of fine pose estimation by aligning the depth map within the 3D model.

During a second part of the head pose estimation, a finer estimate of the head pose is determined. This fine estimate could start from the previously determined rough estimate of the orientation and of the location of one point, such as nose location, in order to improve the speed and robustness. The fine estimate could be computed by determining the orientation of a 3D model of a head (FIG. 7) that best corresponds to the depth map. In one example, the matching of the 3D model to the test depth map may be performed by minimizing a distance function between points of the depth map and corresponding points of the 3D model, for example using an Iterative Closest Point (ICP) method. FIG. 8 schematically illustrates this step of fitting the test depth map (textured in this illustration) 201 within a 3D model 200 (represented as a mesh in this illustration).

This alignment step preferably includes a scaling of the 3D model so that at least some of its dimensions correspond to the test depth map.

The 3D model 200 might be generic, i.e., user-independent. Alternatively, the 3D model might be user-dependent, and retrieved from a database of user-dependent 3D models based for example on the assumed identity of the user 100. A plurality of user-independent 3D models might also be stored and selected according to the assumed gender, age, or ethnicity of the user for example.

In one embodiment, a personal 3D model is generated using a non-rigid Iterative Closest Point (ICP) method. The 3D model may then comprise a mesh with some constraints on the position and/or relations between nodes, so as to allow some realistic and limited deformation in deformable portions of the head, for example in the lower part of the face. In this case, the ICP method may try some deformations or morph of the model, in order to find the most likely orientation given all the possible deformations.

The output of the head pose estimation step may include a set of angles phi, theta, psi describing three rotations with regard to a given coordinate system.

In step D of FIGS. 1 and 12, the 2D textures (in the visible and NIR ranges) of the frame are mapped onto the depth map (UV mapping). It is possible to use only the greyscale value of the visible dataset. This mapping may be performed before or after the pose correction, and generates a textured depth map with a known orientation. Hidden parts, for example portions of the user's face which were hidden or occluded in the depth map, are either flagged as invalid, or reconstructed, for example by supposing a symmetry of the user's face.

This step might also comprise a correction of the illumination in the visible light and/or in the NIR image datasets. The correction of illumination may include a correction of brightness, contrast, and/or white balance in the case of colour images. In one preferred embodiment, the NIR dataset is used to remove or attenuate shadows and/or reflects in the visible light dataset, by compensating brightness variations that appear in portions of the visible light dataset but not in corresponding portions of the NIR datasets.

In step E of FIGS. 1 and 12, the textured 3D image is projected in 2D so as to generate at least one dataset representing a pose-rectified 2D projected image, in the visible and/or in the NIR range. Various projections could be considered. At first, deformations caused by the camera and/or by perspective are preferably compensated. Then, in one embodiment, the projection generates a frontal facial image, i.e. a 2D image as seen from a viewer in front of the user 100. It is also possible to generate a non-frontal facial image, or a plurality of 2D projections, such as for example one frontal facial projection and one another profile projection. Other projections could be considered, including cartographic projections, or projections that introduce deformations in order to magnify discriminative parts of the face, in particular the eyes, the upper half of the face, and reduce the size of more deformable parts of the face, such as the mouth. It is also possible to morph the head to a generic model before comparison, in order to facilitate comparison. Purely mathematical projections, such as projections onto not easily representable space, could also be considered.

Figure 9:
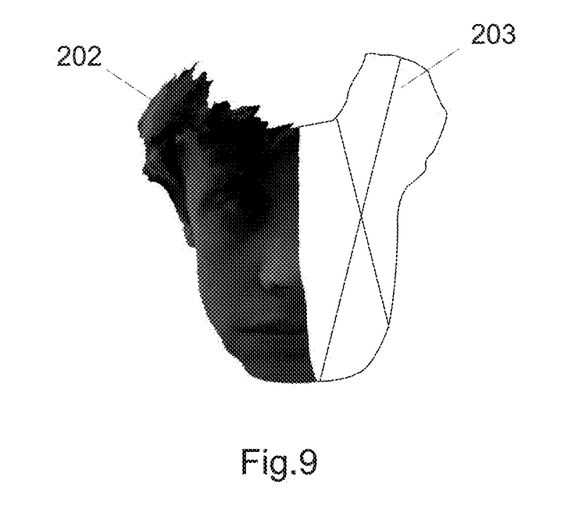
FIG. 9 illustrates a pose rectified 2D projection of the depth map, wherein the missing portions corresponding to portions of the head not present in the depth map are flagged.

FIG. 9 illustrates an example of a 2D textured projection 202 generated during step E. Portions 203 of the projections which are not available in the depth map, for example hidden or occluded portions, are flagged as such.

Figure 10:
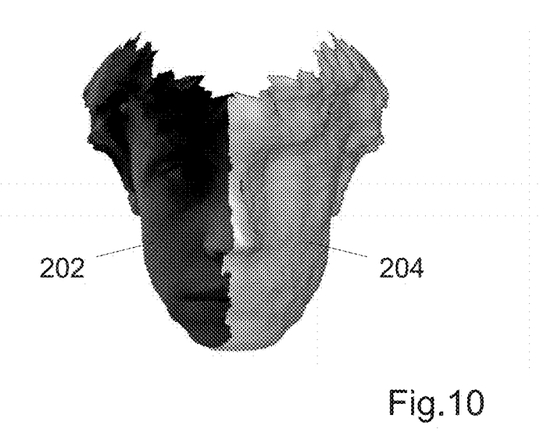
FIG. 10 illustrates a pose rectified 2D projection of the 2.5D dataset, wherein the missing portions corresponding to portions of the head not present in the depth map are reconstructed.
Figure 11:
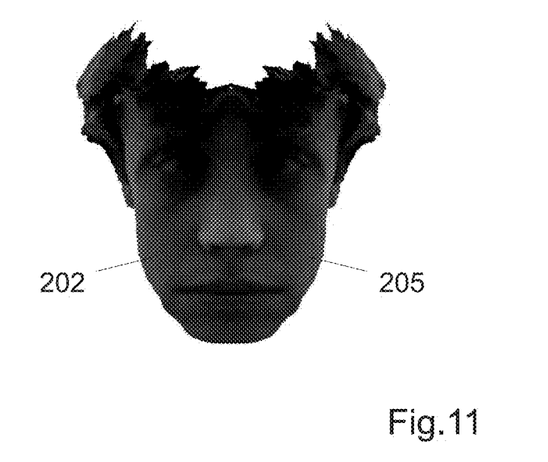
FIG. 11 illustrates a pose rectified 2D projection of the 2.5D dataset, wherein the missing portions corresponding to portions of the head not present in 2.5D are reconstructed and flagged.

FIG. 10 illustrates another example of a 2D textured projection 202 generated during step E. In this embodiment, portions 204 of the projections which are not available in the depth map, for example hidden or occluded portions, are reconstructed as a non textured image. The reconstruction may be based on available portions of the image, for example by assuming that the user's face is symmetric. Alternatively, or in addition, the reconstruction may use a generic model of a head. Alternatively, or in addition, the reconstruction may use image portion data available from other frames in the same video sequence.

FIG. 10 illustrates another example of a 2D textured projection 202 generated during step E. In this embodiment, portions 205 of the projections which are not available in the depth map, for example hidden or occluded portions, are reconstructed as a textured image. The reconstruction may be based on available portions of the image, for example by assuming that the user's face is symmetric. Alternatively, or in addition, the reconstruction may use a generic model of a head. Alternatively, or in addition, the reconstruction may use image portion data available from other frames in the same video sequence.

The above described method thus generates a pose corrected 2D test image dataset of the user, based on a 2.5D test view acquired with a depth camera. During face processing step F, this dataset can then be used by a classifying module, such as a user identification or authentication module, or a gender estimation module, an age estimation module, etc. The classification may be based on a single frame, for example a frame which can be classified with the highest reliability, or with the first frame which can be classified with a reliability higher than a given threshold, or on a plurality of successive frames of the same video stream. Additionally, or alternatively, the classification could also be based on the oriented textured 3D image. Other face processing could be applied during step F.

The methods disclosed herein comprise one or more steps or actions for achieving the described method. Unless a specific order of steps or actions is specified, the order and/or use of specific steps and/or actions may be modified without departing from the scope of the claims.

It is to be recognized that depending on the embodiment, certain acts or events or steps of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

The various operations of methods described above may be performed by any suitable means capable of performing the corresponding functions. The means may include various hardware and/or software component(s) and/or module (s), including, but not limited to a circuit, an application specific integrate circuit (ASIC), a processor, a field programmable gate array signal (FPGA) or other programmable logic device (PLD), discrete gate or transistor logic, discrete hardware components or any combination thereof designed to carry out the method steps described herein.

As used herein, the terms "determining" and "estimating" encompass a wide variety of actions. For example, "determining" and "estimating" may include calculating, computing, processing, deriving, looking up (e.g., looking up in a table, a database or another data structure), ascertaining and the like. Also, "determining" and "estimating" may include receiving, accessing (e.g., accessing data in a memory) and the like.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A pose rectification method for rectifying a pose in data representing face images, comprising the steps of:
    A—acquiring at least one test frame with a depth map camera; wherein the test frame includes 2D near infrared image data, 2D visible light image data, and a depth map;
    B—determining a mesh of points corresponding to a face in the depth map;
    C—estimating the pose of the face detected in the depth map by aligning said face with a 3D model of a head of known orientation, said step of estimating the pose including a step of minimizing a distance function between points of the depth map and corresponding points of said 3D model;
    D—mapping at least one of said 2D image on the depth map, so as to generate textured image data;
    E—projecting the textured image data in 2D so as to generate data representing a pose-rectified 2D projected image.

2. The method of claim 1, comprising a step of temporal and/or spatial smoothing of points in said depth map.

3. The method of claim 1, said step of estimating the pose including a step of performing a rough pose estimation, for example based on random forest, and a further step of determining a more precise estimation of the pose.

4. The method of claim 1, said step of aligning said depth map with a 3D model of a head of known orientation using an Iterative Closest Points (ICP) method.

5. The method of claim 1, further including a step of basic face detection before said estimation of the pose, in order to eliminate at least some portions of said 2D near infrared image data, and/or of said 2D visible light image data, and/or of said depth map which do not belong to the face; wherein said step of basic face detection comprises a step of foreground extraction.

6. The method of claim 1, wherein said 3D model is user-independent.

7. The method of claim 1, wherein said 3D model is user-dependent.

8. The method of claim 1, wherein said 3D model is warped to adapt it to the user.

9. The method of claim 1, wherein said step of aligning said depth map with an existing 3D model of a head comprises warping said 3D model.

10. The method of claim 1, further comprising a step of correcting the illumination of portions of said 2D visible light image data based on said 2D near infrared image data, wherein said step of correcting comprises a step of compensating brightness variations that appear in portions of 2D visible light image data but not in corresponding portions of the 2D near infrared image.

11. The method of claim 1, further comprising a step of flagging portions of said pose-rectified 2D projected image data which correspond to portions not visible on said depth map.

12. The method of claim 1, further comprising a step of reconstructing portions of said pose-rectified 2D projected image data which correspond to unknown portions of said depth map.

13. The method of claim 1, further comprising a step of classifying said 2D projected image.

14. An apparatus comprising a depth map camera arranged for acquiring at least one test frame, wherein the test frame includes 2D near infrared image data, 2D visible light image data, and a depth map; and a processor with a memory storing a program that causes said processor to carry out following steps when the program is executed:
    B—determining a mesh of points corresponding to a face in the depth map;
    C—estimating the pose of the face detected in the depth map by aligning said face with a 3D model of a head of known orientation, said step of estimating the pose including a step of minimizing a distance function between points of the depth map and corresponding points of said 3D model;
    D—mapping at least one of said 2D image on the depth map, so as to generate textured mage data;
    E—projecting the textured image data in 2D so as to generate data representing a pose-rectified 2D projected image.

15. A computer-program product, comprising non-transitory computer readable medium comprising instructions executable to:
    A—acquire at least one test frame with a depth map camera; wherein the test frame includes 2D near infrared image data, 2D visible light image data, and a depth map;
    B—determining a mesh of points corresponding to a face in the depth map;
    C—estimate the pose of the face detected in the depth map by aligning said face with a 3D model of a head of known orientation, said step of estimating the pose including a step of minimizing a distance function between points of the depth map and corresponding points of said 3D model;
    D—map at least one of said 2D image on the depth map, so as to generate textured image data;

E—project the textured image data in 2D so as to generate data representing a pose-rectified 2D projected image.

16. A pose rectification method for rectifying a pose in data representing face images, comprising the steps of:
   A—acquiring at least one test frame; wherein the test frame includes 2D near infrared image data, 2D visible light image data, and a depth map;
   B—determining a mesh of points corresponding to a face in the depth map;
   C—estimating the pose of the face detected in the depth map by aligning said face with a 3D model of a head of known orientation, step of estimating the pose including a step of minimizing a distance function between points of the depth map and corresponding points of said 3D model;
   D—correcting the illumination of portions of said 2D visible light image data using said 2D near infrared image data and mapping said corrected 2D visible light image on the depth map, wherein said step of correcting comprises a step of compensating brightness variations that appear in portions of 2D visible light image data but not in corresponding portions of the 2D near infrared image;
   E—projecting the textured image data in 2D so as to generate data representing a pose-rectified 2D projected image.

* * * * *